US007135821B2

(12) United States Patent
Skupien et al.

(10) Patent No.: US 7,135,821 B2
(45) Date of Patent: Nov. 14, 2006

(54) HIGH-DEFINITION CATHODE RAY TUBE AND ELECTRON GUN

(75) Inventors: Thomas A. Skupien, Buda, TX (US); Byron G. Zollars, Georgetown, TX (US)

(73) Assignee: Altera Corporation, San Jose, CA (US)

( * ) Notice: Subject to any disclaimer, the term of this patent is extended or adjusted under 35 U.S.C. 154(b) by 210 days.

(21) Appl. No.: 10/676,329

(22) Filed: Oct. 1, 2003

(65) Prior Publication Data

US 2005/0073259 A1 Apr. 7, 2005

(51) Int. Cl.
*H01G 7/44* (2006.01)

(52) U.S. Cl. .......................... 315/42; 315/16; 313/414

(58) Field of Classification Search .............. 315/5.37, 315/15, 16, 42; 313/414, 444, 449
See application file for complete search history.

(56) References Cited

U.S. PATENT DOCUMENTS 3,895,253 A * 7/1975 Schwartz et al. ............. 315/14
4,168,452 A * 9/1979 Christensen et al. .......... 315/16
5,347,292 A * 9/1994 Ge et al. .................. 345/75.2

* cited by examiner

*Primary Examiner*—Tuyet Vo
*Assistant Examiner*—Jimmy Vu
(74) *Attorney, Agent, or Firm*—Martine Penilla & Gencarella, LLP

(57) ABSTRACT

A high-definition CRT is provided having an electron gun to produce high beam current without increasing spot size and to provide lower electrical power requirements at high beam-modulation frequencies. The electron gun includes three electrodes having clusters of apertures to allow collimation of the electron beam from a cathode. The main lens is operated to focus a parallel beam of electrons on a display screen. Methods for manufacturing by mechanical or semiconductor methods are also provided.

37 Claims, 12 Drawing Sheets

HIGH-DEFINITION CATHODE RAY TUBE AND ELECTRON GUN

This application is related to U.S. Patent Application Publication No. US 2002/0089277, filed Jan. 5, 2002.

BACKGROUND OF THE INVENTION

1. Field of the Invention

This invention pertains to cathode ray tubes or other electronic devices employing electron beams, and particularly to those cathode ray tubes and electron guns contained therein that are used to display high-resolution imagery.

2. Discussion of Related Art

The principal components of a cathode ray tube (CRT) are (FIG. 1): an envelope 101, an electron gun 102 (which has a "beam-forming region" 103 and a main lens region 104), a deflection yoke 105, and a display screen 106. A typical prior-art electron gun beam-forming region 103 consists of a cathode 107, a first electrode 108 (often called a "Wehnelt" or "suppressor" electrode) with an aperture 109 and a second electrode 110 (often called an "extractor" electrode) with a coaligned aperture 111. The primary function of the beam-forming region is to allow control of the electron beam current, and to establish the emitted electrons along trajectories 114 that allow formation of a small spot on the display screen. The extractor electrode in conjunction with a subsequent electrode may form a pre-focus lens region 112. The main lens region 104 of the electron gun will typically consist of one or more focus electrodes and a final anode electrode 113. The pre-focus lens region 112 and main lens region 104 create a focusing apparatus that bends the trajectories 114 of the electrons emanating from the beam-forming region 103 into converging paths so that they form a small spot on the screen 106. The deflection yoke 105 is used to scan the focused electron beam in a raster or vector-based pattern on the screen 106 to form the display imagery.

Depending upon the end use of the CRT, the electron gun 102 is typically of either mono-beam, as depicted in FIG. 1, or a three-beam type, forming a single spot or three spots, respectively. In a three-beam electron gun, each of the three beams emanates from its own beam-forming region, providing individual control over the current produced in that beam. The three beams may either have individual pre-focus and main lens assemblies, or all of the beams may share a single pre-focus and main lens region. In a three-beam electron gun used in a color display it is common for there to be electromagnetic means for overlapping the three electron beam spots in the same color phosphor trio's location on the display screen.

Mono-beam guns are frequently used in CRTs for projection television displays or monochrome displays. Three-beam electron guns are generally used in CRTs that produce a color display. In this case, additional components (such as a shadow mask) are used to direct the three beams to the appropriate color phosphors on the screen. Main lenses are of three principal types, which are described in U.S. Patent Application Publication No. US 2002/0089277, filed Jan. 5, 2002, which is hereby incorporated by reference herein.

The most important operating characteristics of CRTs are video image brightness, resolution and display size. In a typical CRT, increasing brightness reduces resolution because the electron beam spot size increases at higher electron beam current levels. Increasing the display size without increasing the beam current reduces the video image brightness (per unit area) because the emitted electron beam must cover a larger display area. The resolution of a CRT is determined by the finest spatial intensity changes that can be written to the display screen by the electron beam. Accordingly, the resolution of a CRT is thus determined by both the spot size and the rate at which the electron beam current can be modulated. The electron beam current modulation rate is affected by the speed of the video driver electronics and the voltage range required by the electron gun beam-forming region. To produce a high resolution display in a typical CRT it is necessary to (1) produce a small electron beam spot on the screen, (2) operate the beam-forming region of the electron gun to minimize the voltage range required for beam current modulation, and (3) use video driver electronics that have very fast voltage change capability. In typical prior art CRTs, items (1) and (2) cannot be achieved simultaneously without changes to the electron gun design that would compromise the manufacturing tolerances, and thus increase the cost of the electron gun, and item (3) is costly and causes reduced reliability due to the increased power dissipation in the high-speed electronics.

Prior art CRTs operate such that the main lens of the electron gun converges an initially divergent electron beam to a spot on a display screen. In this mode of operation, the electrons emitted from the cathode are focused together by the beam-forming electrodes into a small region close to the center of the suppressor and extractor electrode apertures, known as the "crossover". The crossover is a natural consequence of the operation of the suppressor and extractor electrodes as an immersion lens, and exists because of the shape of the electrostatic fields generated in the beam-forming region by the cathode and the beam-forming electrodes. By adjusting the voltages of the electrodes that comprise the main lens of the electron gun, the crossover is positioned in the object plane of the main lens and the display screen is placed in the image plane of the main lens. The focal distance of the main lens is thus adjusted to image the crossover onto the display screen. In this mode of operation, the spot size will be determined by the size of the crossover, which is in turn determined by the size of the electron emission area on the cathode and the electron-optics characteristics of the beam-forming electrodes of the gun.

FIGS. 2A and 2B depict a beam-forming region 200 with thermionic cathodes. Heating of a cathode 201 causes electrons to be emitted at a cathode surface 202. Some of the electrons are pushed back to the cathode surface by a suppressor electrode 203, but an extractor electrode 204 is maintained at a sufficiently positive voltage relative to the suppressor electrode 203 to allow an accelerating electric field to penetrate through a circular optical aperture 205 in the suppressor electrode 203 to the surface of cathode 202. The accelerating electric field extracts electrons from the surface of the cathode 201 in the area where the accelerating electric field exists. This configuration results in a converging electron beam 206 that crosses over the central axis of symmetry 211 at a position between the suppressor electrode 203 and the extractor electrode 204. This position is typically referred to as a "first crossover" 209. For a fixed positive voltage applied to the extractor electrode 204 and a zero or reference voltage applied to the suppressor electrode 203, adjusting the voltage of the cathode surface 202 will cause more or less accelerating electric field penetration to the cathode surface 202. In FIG. 2A, the cathode voltage is less than, but close to the voltage applied to the extractor electrode 204, and is the same as an isopotential contour 207. Isopotential contours less than the potential of the cathode 201, such as an isopotential contour 208, represent an electric field that repels electrons back to the cathode surface 202. Isopotential contours that are greater than the cathode voltage and adjacent to the cathode surface 202 represent an extracting electric field in that region of the cathode surface 202. Since the cathode potential is close to that of the extractor electrode 204, only a small region of the cathode surface 202 is emitting electrons and thus the emitted beam current is small. The shape of the electron trajectories, including the position and the size of the first crossover 209, is determined by the shape of the electric field in the vicinity of the cathode surface 202 and the optical aperture 205. In FIG. 2B, the cathode voltage is lowered to a value greater than but close to the voltage of the suppressor electrode 203, and is equal to the potential of the isopotential contour 208. Because of the larger amount of the cathode surface 202 that is exposed to the extracting electric field, the emitted current is much larger. The beam-forming region 200 thus effectively forms a controllable iris 210 at the cathode surface 202, which controls the emitting area of the cathode. The iris 210 is opened or closed by the varying voltage on the cathode 201. If the voltage of the cathode 201 is brought closer to the voltage on the suppressor electrode 203 then the cathode's active emitting surface becomes larger in diameter. Because of electron-optical aberrations in the immersion lens and transverse thermal velocities of the electrons, the size of the crossover 209 also varies with beam current. The crossover 209 is the object in the electron optical system, in which lenses in the other parts of the electron gun focus the object to form an image on the screen. Therefore, varying the cathode voltage to cause more current to escape from the cathode 201 increases the image size for the optical system, which in turn increases the size of the spot on the screen. Decreasing optical aperture size 205 to obtain a smaller crossover 209 and thus a smaller spot on the screen is limited in effectiveness because higher voltages must be applied to the extractor electrode 204, a larger range of current control voltages must be applied to the cathode 201, and the resulting larger cathode current density, in some cases, may damage the cathode surface 202. Additionally, if the voltage on the extractor electrode 204 is increased, this increases the cathode voltage required to completely turn off the electron beam 206. This causes the active cathode surface area to decrease in size, which in turn decreases crossover size, and thus spot size, but it also reduces the slope of the current versus biasing voltage curve (the "drive curve"). Increasing the voltage on the extraction electrode 204 also increases the angle at which electrons in the beam 206 leave the cathode 201, which may then require an additional focus electrode to be required in the electron gun, increasing its cost. In practice, the trade-off between spot size on the screen and the drive curve necessary for the required electron current is made in accordance with the needs of the equipment employing the electron gun. In general, in a prior-art electron gun, if a smaller-slope drive curve is required to increase beam current from the cut-off value to full current, less electrical power will be required to drive the electron gun, but the spot size will be larger.

Typically in a CRT, the electron beam current which is associated with a dark screen is on the order of 1 microampere and the electron beam current associated with a fully bright screen is on the order of 1 to 2 milliamperes. That factor of 1,000 change in beam current over the useful drive range of the display requires a large voltage change to be applied to the cathode in order to switch the beam current from that appropriate for a dark screen to the beam current appropriate for maximum brightness. For standard NTSC television signals, the frequency components associated with the video brightness extend to approximately 7 megahertz. In a high definition television the situation is more stressful because the beam current must be modulated by applying the same large cathode voltage changes at frequencies in the range of 100 megahertz. The power requirement to modulate the beam current at these frequencies can be large and is an important consideration in the design of a CRT for high definition television.

Prior art monochrome and color electron guns operate with a single electron beam and three electron beams, respectively. In these guns, each of the beams passes through a single aperture in each of the electrodes making up the beam-forming region (as in FIG. 1). Although it is possible to vary the aperture diameters in the beam-forming electrodes, and to also vary the spacing of the electrodes, restricting these variations to practical values limited by manufacturing and positioning tolerance makes only moderate changes to the spot size, drive range, and maximum beam current. An electron gun having multiple apertures in the first and second electrodes of the gun is disclosed in Publication Number U.S. 2002/0089277 (incorporated by reference). In the electron gun disclosed, electrons emitted from a cathode surface pass through the multiple apertures in two beam-forming electrodes and are then converged into a single high current beam by a pre-focusing lens. The high current single beam then passes through a main lens, which may focus the beam onto a display screen of a CRT. The disclosed electron gun has an improved drive curve relative to prior art CRTs, with no degradation in spot size.

Patent Application Publication No. 2002/0167260 discloses an electron gun assembly wherein the first and second electrodes include a plurality of beam passage apertures, which are aligned on each the first and second beam-forming electrodes in a direction perpendicular to a direction in which an electron beam is scanned. This application describes a means of producing an elliptical spot on the screen that is suitable for specialized color displays that do not have a shadow mask but use a single electron beam to provide information for all colors. In this application the inventors seek to use a plurality of beam passage apertures instead of a single rectangular or elliptical aperture in the beam-forming electrodes. Their claim is that this provides better control over the shape of the desired elliptical spot. The inventors do not use the beam passage apertures to collimate the electron beam, nor is the main lens focused such that the size of the spot on the screen is minimized. In addition, the application does not teach the benefits of such a structure for reducing the drive range of the CRT.

What is needed is an improved beam-forming assembly, improved electron gun, and improved cathode-ray tube to allow the display of high-resolution imagery without spot size increase with increasing electron beam current. The electron gun should also allow lower consumption of electrical power in high-frequency video modulation CRTs, such as used in high definition television. Also, the electron gun should provide lower current load per unit area of the cathode. Methods for manufacturing the beam-forming region and electron gun are also needed.

SUMMARY OF THE INVENTION

A CRT and an electron gun for high-definition color or monochrome displays are provided that produce an electron beam comprised of a plurality of collimated sub-beams of electrons, the sub-beams originating from separate areas of a cathode and passing through a cluster of apertures in three beam-forming electrodes positioned between the cathode and the main lens. The collimated sub-beams are focused by a main lens operated such that the collimated sub-beams are focused to a single spot on a screen. Methods of manufacturing the electrodes to form the collimated sub-beams using mechanical, bonded structures or semiconductor manufacturing techniques are provided.

BRIEF DESCRIPTION OF THE FIGURES

The drawings described here, in conjunction with the general description of the invention above and the detailed description below constitute the specification of the invention and exemplify the principles of the invention.

DESCRIPTION OF PREFERRED EMBODIMENTS

Figure 1:
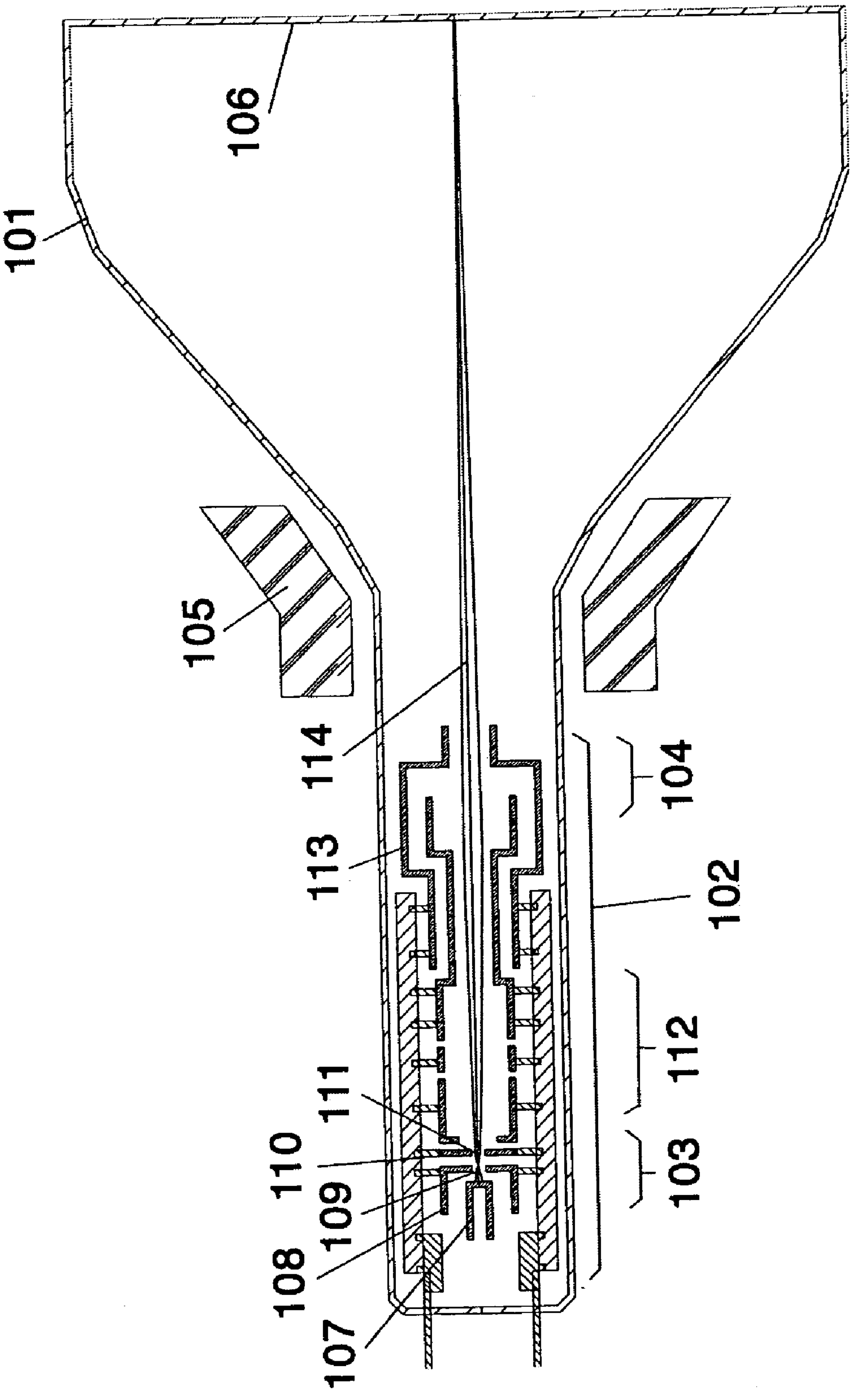
Fig. 1 (Prior Art)
FIG. 1 is a cross-section view of a prior art mono-beam cathode ray tube, showing relative position of the vacuum envelope, electron gun, deflection yoke, and display screen.
Figure 2:
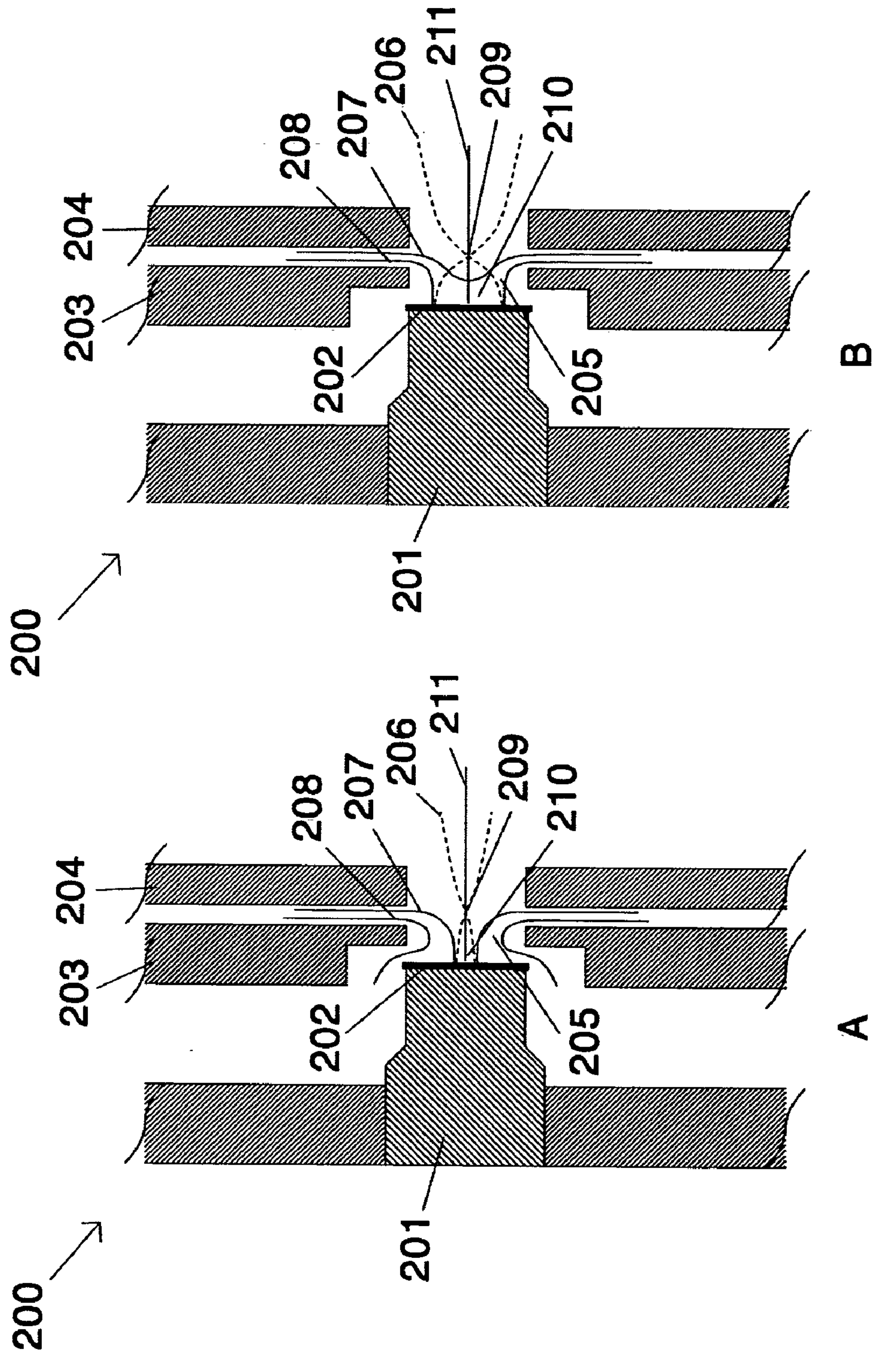
Fig. 2 (Prior Art)
FIG. 2 is a cross-section view of a prior art beam-forming region, or vacuum triode, with the cathode biased in two different operating configurations.
Figure 3A:
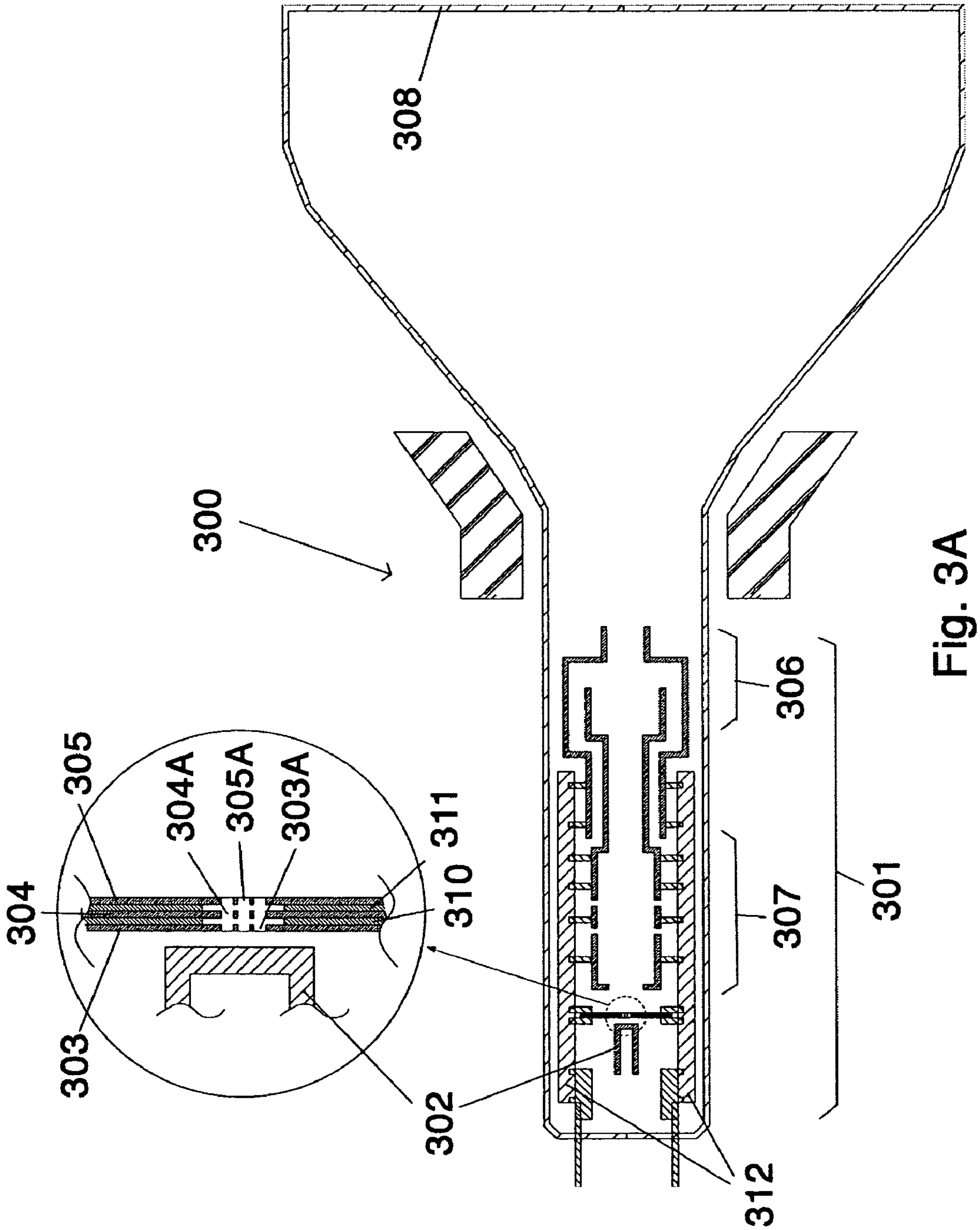
FIG. 3 is a cross-section view of a mono-beam cathode-ray tube containing an electron gun which further contains the beam-forming region of the present invention.

FIG. 3A illustrates a mono-beam CRT 300 of the present invention, such as may be used in a high-resolution projection or monochrome display. A mono-beam electron gun 301, having a cathode 302, a first beam-forming electrode 303, a second beam-forming electrode 304 and a third beam-forming electrode 305 is shown (refer to inset). The first and second beam-forming electrodes 303, 304 are electrically separated by an insulator 310, and the second and third beam-forming electrodes 304, 305 are electrically separated by another insulator 311. It should be understood to one skilled in the art of electron gun construction that the insulators 310, 311 may be comprised of a vacuum gap, dielectric material, polymer material, or any other electrically insulating material that is compatible with the vacuum and thermal requirements of vacuum tube production and operation.

A main lens 306 and a plurality of pre-focus electrodes 307 are disposed between the three beam-forming electrodes 303, 304, 305 and a screen 308, all of which are symmetric around an axis that passes through the electron gun 301. It is to be understood that the invention can include any type of main lens configuration known in the art of electron guns, such as einzel (uni-potential), bi-potential, or even hybrid types such as uni-bi-potential lenses. In addition, it is common for electron guns to employ one or more electrodes that serve as a pre-focus lens, whose main function is to modify the electron beam so that it has a desired shape and size upon entering the main lens 306. Electron-beam shaping can be applied for optimizing spot size, controlling spot shape in different regions of the screen, or for correcting or inducing astigmatism in the electron beam prior to the main lens. Whatever the electrode configuration, it is accepted practice to hold all elements of the electron gun in relative alignment with one another by embedding anchor tabs on the electron gun parts into two or more glass rods 312 that span the length of the electron gun. The electron gun is normally assembled by placing the cathode (or a cathode holder into which the cathode can later be inserted), the beam-forming electrodes, which may be separated by insulating material, the pre-focus electrodes and the main lens on first alignment rods such that all parts of the electron gun are accurately aligned along an axis. Then the electron gun is affixed to "glass rods," which serve as permanent second alignment rods. The first alignment rods are then withdrawn.

Figure 3B:
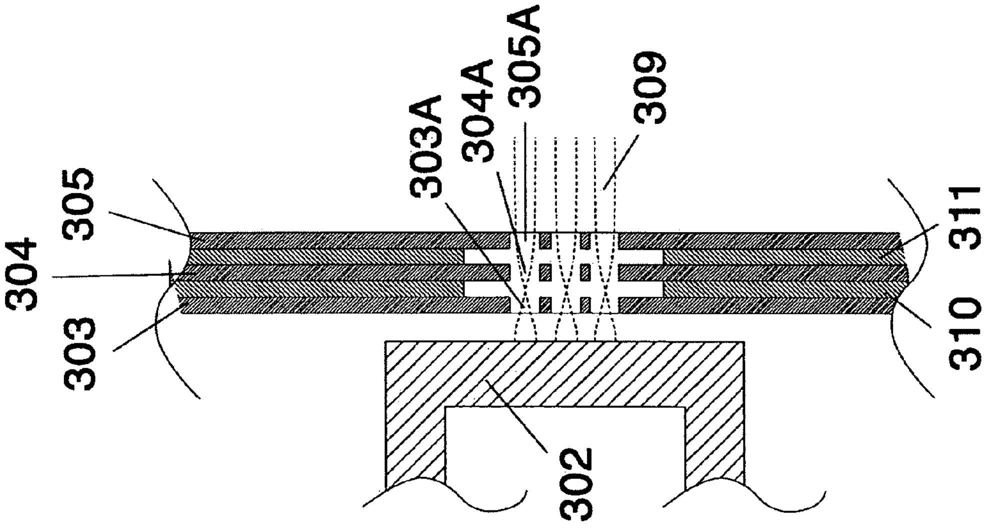

As shown in the inset drawing of FIG. 3A, beam-forming electrodes 303, 304 and 305 each contain an aperture cluster 303A, 304A and 305A, respectively, each aperture within the cluster being coaxially aligned with the corresponding aperture in the aperture cluster of the other beam-forming electrodes and parallel to the axis of the electron gun. The number of apertures in each aperture cluster may vary from 4 to about 55 or more, but normally this number is in the range from about 6 to about 17. The purpose of each aperture in the three beam-forming electrodes is primarily to produce a collimated sub-beam of electrons 309 from the cathode 302, as shown in FIG. 3B. Thus, multiple electron emission sites are formed on the cathode 302, aligned with the center of each aperture in the aperture cluster 303A. The total current in the electron beam is proportional to the number of apertures in the aperture clusters 303A, 304A, and 305A. As is well known to those of skill in the art, spot size is proportional to the product of the angular spread of the sub-beams 309 and the size of the aperture clusters 303A, 304A, and 305A.

One of the objectives of the present invention is to produce a plurality of sub-beams 309 that are collimated, i.e. have a very low angular spread, within the aperture clusters 303A, 304A, and 305A, with a diameter of the clusters that is similar to the diameter of prior art beam-forming apertures, thus resulting in a smaller and more constant spot size over a range of operating currents. It should be noted that for the present invention to operate correctly, the main lens 306 must be adjusted to have an object distance of infinity, and a focal length which is the same as the distance between the main lens 306 and the screen 308. Those skilled in the art of optics will recognize that the main lens 306 is acting like a telescope, focusing all electrons with a certain angle to the same point on the screen 308, substantially independent of their initial distance from the optical axis of the electron gun 301. Correspondingly, when the focal distance of the main lens 306 is adjusted correctly, all of the sub-beams 309 will be observed to coalesce into a single small spot on the screen 308, the dimensions of the spot determined primarily by the degree of collimation effected by the first, second, and third beam-forming electrodes 303, 304, and 305, respectively. Note that the described operation of the main lens 306 of the present invention differs from that of prior art electron guns, where the main lens is actually forming an image of a real object (the first crossover), located at a finite distance from the main lens. Indeed, operating the main lens 306 of the present invention in a manner appropriate for a prior art electron gun will result in a spot pattern on the CRT screen 308 resembling the shape of the aperture cluster. This spot shape is unacceptable for a CRT display.

An axis of an electron gun defines a line of symmetry of the components that make up the electron gun. This axis is generally concurrent with the line of symmetry of the tube containing the gun. The thickness of the beam-forming electrodes 303, 304, 305 and the insulators 310, 311, the diameter of the aperture cluster, the diameter of the apertures 303A, 304A, 305A, and the spacing between the first beam-forming electrode 303 and the cathode 302 are critical to the proper operation of the invention. In most embodiments of the beam-forming assembly, the thickness of the first, second, and third beam-forming electrodes is between 1 and 150 micrometers. A preferred embodiment has first, second, and third beam-forming electrode thicknesses of 25 micrometers. In most embodiments of the beam-forming assembly, the insulator thickness is between 10 and 150 micrometers. If insulators are not used in the beam-forming assembly, the spacing between the beam-forming electrodes can be between 10 and 150 micrometers. The preferred insulator thickness or electrode spacing is in the range from about 50 micrometers to about 70 micrometers. The electrodes and any insulators are disposed along the axis of the gun.

In most embodiments of the beam-forming assembly, the aperture clusters in all beam-forming electrodes have a circular enclosing shape whose diameter is in the range from about 30 to about 2500 micrometers. Each aperture may have a diameter in the range from about 15 to about 250 micrometers. A preferred embodiment has all aperture diameters in the range from about 140 to about 150 micrometers. Embodiments of the beam-forming assembly with different-sized aperture diameters within an aperture cluster are possible, and in some cases may be desirable to allow fine control of the shape of the spot on the screen.

One skilled in the art of electron gun manufacturing will recognize that there are limitations on the materials that can be used to fabricate the beam-forming electrodes and insulators, primarily due to the requirements of the vacuum environment of the tube, and the thermal processing that takes place to create the vacuum. These limitations notwithstanding, it will be recognized that beam-forming electrode materials can be constructed from any electrically-conductive material, including metals, intrinsic or doped semiconductors, evaporated thin films, or composite materials containing sufficient conductive material to cause the electrode to be electrically conductive.

Figure 4:
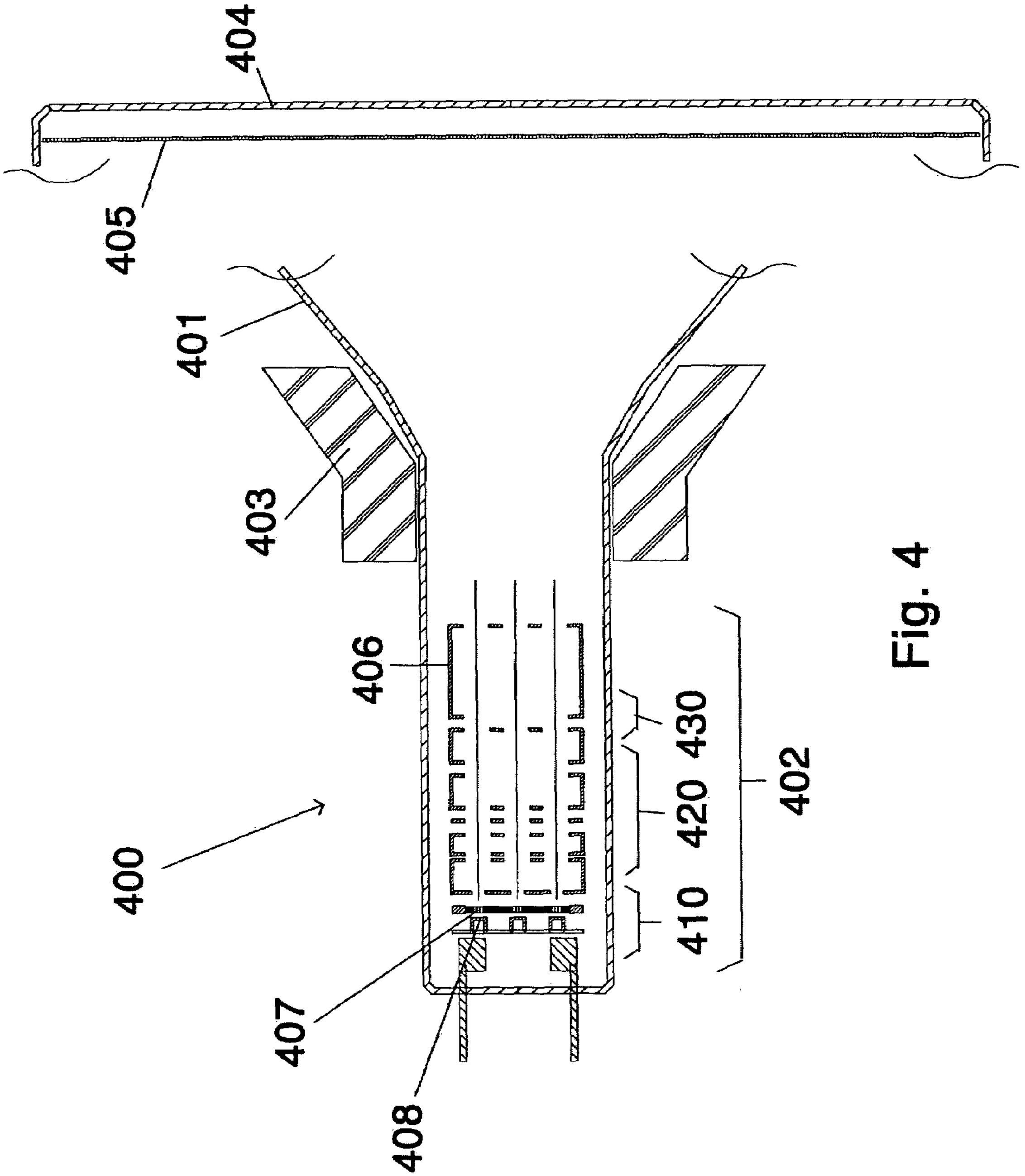
FIG. 4 is a cross-section view of a three-beam color cathode-ray tube containing an electron gun which further shows the beam-forming region of the present invention.

FIG. 4 illustrates a three-beam CRT 400 of the present invention, such as may be used in a high-resolution color display application. The CRT consists of a vacuum envelope 401, a three-beam electron gun 402, a deflection yoke 403, a display screen 404, and a shadow mask 405. The electron gun 402 is further divided into a beam-forming region 410, a pre-focus lens region 420, and a main lens 430, containing an anode electrode 406. The beam-forming region 410 is similar to that described for a mono-beam electron gun, except that the electrodes and insulators comprising the beam-forming region 410 contain three aperture clusters 407, one for each of the electron beams. The three electron beams operate independently, with their respective beam currents being controlled by the voltages on their respective cathodes 408. Although the three-beam electron gun is shown here in a generic sense, it is clear that the beam-forming assembly 410 of the present invention is capable of improving the drive curve and spot size of any type of electron gun. Many such gun types are known in the art, such as those with different numbers of independent electron beams, those with different types of main lens configurations, those with different types of pre-focus lens arrangements, and those with variations in dynamic focus and astigmatism correction. Those skilled in the art of electron guns and electron optics will recognize that there exists no limitation on electron gun type for realizing the benefits of the present invention. The electron gun may be assembled as described above.

Figure 5:
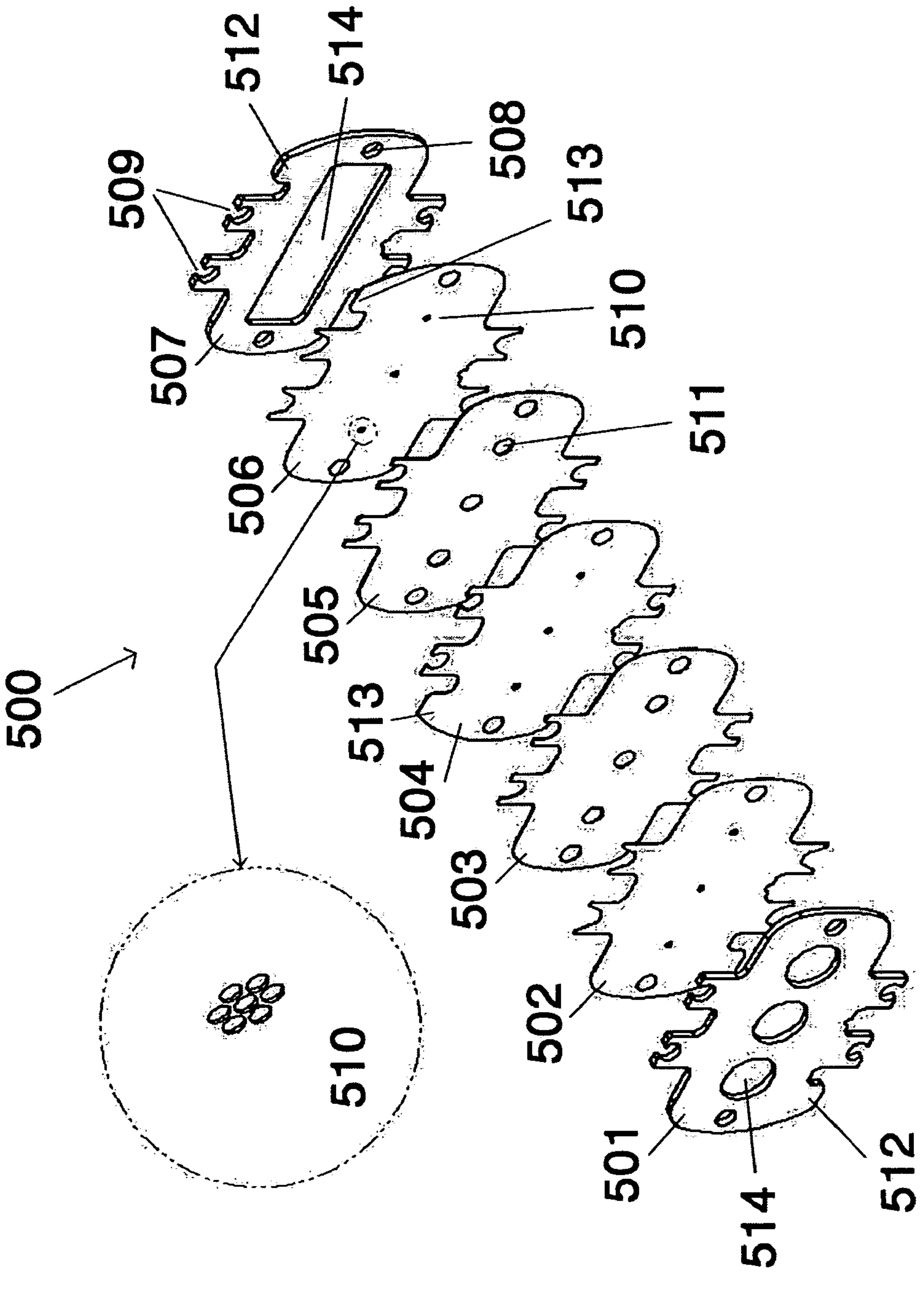
FIG. 5 is an exploded view of the metal and insulating electrodes used to form the beam-forming region of the present invention.

FIG. 5 shows an exploded drawing for a beam-forming electrode assembly 500 pertaining to the present invention, consisting of a first support bracket 501 and a second support bracket 507, between which are disposed first, second, and third beam-forming electrodes, 502, 504, and 506, respectively, each of the beam-forming electrodes including a plurality of aperture clusters 510. The beam-forming electrodes are separated by a first insulator 503 and a second insulator 505, each of which has a plurality of apertures 511. Features of this embodiment of the beam-forming assembly 500 include alignment holes 508 that allow alignment pins or rods to pass through and enforce a high-precision relative alignment between the beam-forming electrodes 502, 504, 506. The alignment pins (or rods) would also typically align all electrodes in the electron gun. Generally, the beam-forming electrodes 502, 504, and 506 would have alignment holes 508 to provide an interference fit to the alignment pins. The alignment holes 508 in the support brackets 501 and 507, and the alignment holes in the insulators 503 and 505 may be a looser fit. Alignment holes 508 appear in the same relative position on all parts of the assembly, and hold the beam-forming assembly 500 in strict self-alignment and in strict alignment relative to the other gun electrodes before the components are affixed to “glass rods” (herein also called “second alignment rods”) that are typically used in electron guns to provide permanent alignment. Another feature of this embodiment is anchor tabs 509, which appear in the same relative position on all parts of the assembly, whose function is to become embedded into the glass rods, thereby providing permanent alignment of the electron gun. Support bracket electrical connection tabs 512 for affixing a wire or other means of applying a voltage to each support bracket 501, 507, and thus to the directly-adjacent beam-forming electrode 502 or 506, respectively, are provided. The second beam-forming electrode 504 is insulated from the support brackets 501, 507, so an electrical connection is made to it by affixing a wire or other voltage source means to electrical connection tab 513. Another feature is a support bracket clear aperture 514, which allows the electron beams to make passage through the apertures in the beam-forming electrodes 502, 504, 506, without interference from the support brackets 501, 507. Although shown here as large rectangular or circular openings in the support brackets, it should be understood that the support bracket clear aperture 514 can be any shape or size or multiplicity, the only limitation being that the beam-forming electrode aperture clusters 510 are not blocked by the support brackets 501, 507. For example, the support bracket clear aperture 514 can be one large rectangular aperture, or it can be three circular apertures that are concentric with the aperture clusters in the beam-forming electrodes 502, 504, 506, both shown in FIG. 5. Those skilled in the art of electron optics will recognize that for certain configurations of electron guns, and for certain thicknesses of support brackets 501, 507, a support bracket clear aperture 514 whose perimeter is in close proximity to the electron beam will act as a lens, and will produce a deflection of electrons in the beam. In some cases, this function of the support brackets 501, 507 can be used to improve the performance of the electron gun, for example to reduce the spot size, and is thus considered to be a feature of the present invention.

In most embodiments, the thickness of the support brackets 501, 507 will be between 100 micrometers and 5000 micrometers, and the support bracket clear aperture 514 will have a distance to the enclosing shape of the beam-forming electrode aperture cluster 510 of between 100 micrometers and 2 centimeters. One preferred embodiment has a support bracket thickness of approximately 500 micrometers, and support bracket clear apertures 514 that consist of circular apertures of diameter 4000 micrometers concentric with each of the aperture clusters 510 in the beam-forming electrodes 502, 504, 506.

The support brackets 501, 507 are preferably fabricated from stainless steel, but other metals, semiconductors, or alloys may be used, of which copper, aluminum, KOVAR or doped silicon are examples. Since electron guns generally have different types of support structures for the various electrode parts that comprise them, we explicitly include the possibility of variations in the position, size, composition, or other disposition of the support brackets 501, 507, anchor tabs 509, alignment holes 508, aperture cluster spacings, support bracket tabs 512, and electrode connection tabs 513 to accommodate variations in the electron gun design.

Also illustrated are the locations of the aperture clusters 510 in each beam-forming electrode 502, 504, 506. The insulator apertures 511 are designed to be concentric with the aperture clusters 510, but generally have a larger diameter than the diameter of the aperture cluster 510. The larger diameter of the insulator aperture 511 prevents the possibility of insulator charge accumulation during periods of electron beam passage. In addition, the larger diameter of the insulator aperture 511 prevents distortion of the electric field between the beam-forming electrodes due to the effect of the electrical permittivity of the insulator material.

Details of operation of one configuration of the beam-forming assembly 500 is described below, referring to FIG. 5. The first beam-forming electrode 502 acts as a suppressor electrode and is normally set to 0 volts. The second beam-forming electrode 504 acts as an extractor electrode and is normally set to a voltage between 100 and 900 volts. The third beam-forming electrode 506 effectively collimates the electron sub beams as they exit the beam-forming region 500, and is normally set to a voltage between −300 and 500 volts. The exact operating voltages of the beam-forming electrodes 502, 504, 506 are dependent upon the geometry and voltages of the electron gun pre-focus electrodes (FIG. 4, 420) and anode electrode (FIG. 4, 406), as well as the thickness and spacing of the beam-forming electrodes 502, 504, 506 themselves. The voltage applied to the third beam-forming electrode 506 may be varied to allow the degree of collimation of the electron sub-beams to be varied. Varying the voltage to increase the angular distribution of the electrons in the sub-beams increases the size of the spot on the screen. If the size of the spot in one area of the screen, such as in the center of a screen, is to be adjusted to match the size of the spot at the corner of the screen, for example, a larger spot size in the center may be obtained by adjusting the voltage on the third beam-forming electrode 506 while the beam is in that area of the screen. In other words, the emittance of the electron beam may be adjusted by applying varying voltage to the third beam-forming electrode 506, and this may be done dynamically as a function of where the beam is on the display screen.

The thickness of the beam-forming electrodes 502, 504, 506 in successful embodiments of the invention may range from about 10 micrometers to about 150 micrometers, with a preferred embodiment having a first beam-forming electrode 502 thickness, second beam-forming electrode 504 thickness, and third beam-forming electrode 506 thickness, all of about 25 micrometers.

Figure 6:
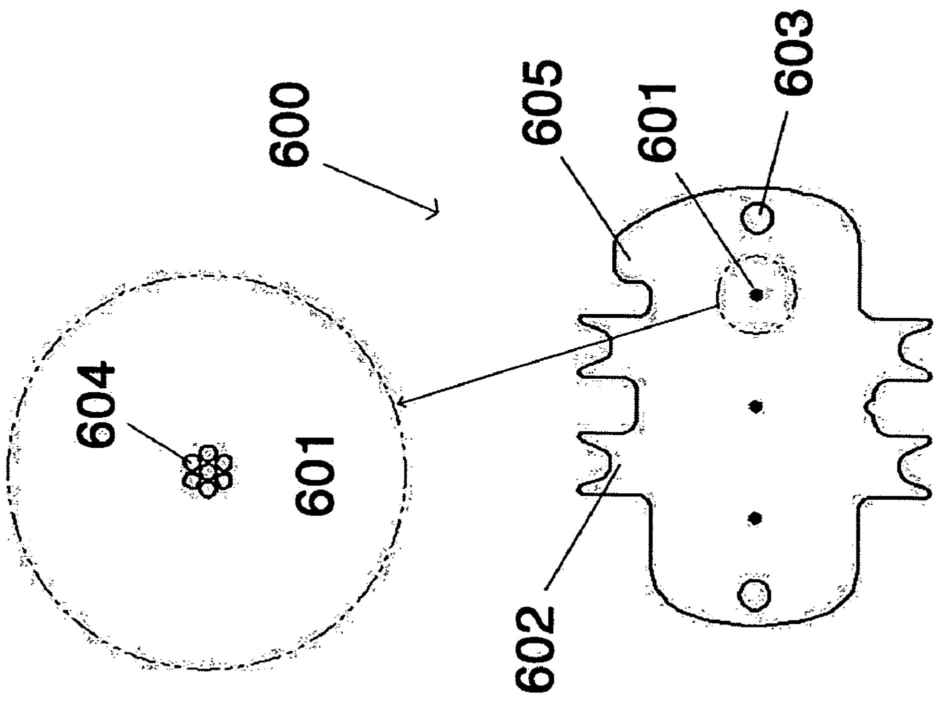
FIG. 6 is a detailed view of the metal electrode of the beam-forming region for a three-beam electron gun used in a color CRT, showing placement of aperture clusters for the three electron beams, and placement of apertures within each aperture cluster.

FIG. 6 shows the detail of a preferred embodiment for a single beam-forming electrode 600 for a three-beam electron gun that may be used in a high-definition color CRT. There are three aperture clusters 601 in the beam-forming electrode 600, each consisting of seven apertures 604 positioned in a close-packed hexagonal pattern. In this arrangement, there is one of the apertures 604 (the center aperture) that is on the axis of the aperture cluster 601 and on the axis of the electron gun, with the remaining six apertures equally distributed in angle at the same radial distance from the axis of the aperture cluster 601. It is to be understood that the diameters of the individual apertures 604 and the diameter of the aperture cluster 601 and the number of apertures in the aperture cluster 601 may be chosen depending upon the needs of the application. In this preferred embodiment of the beam-forming electrode 600, the apertures 604 have a diameter of 150 micrometers, and a center-to-center spacing of 175 micrometers. Successful embodiments of the electrode may be realized with aperture diameters in the range from about 15 micrometers to about 500 micrometers, and aperture clusters 601 with from 4 to 55 apertures, having aperture spacings that are consistent with aperture cluster diameters of between 30 micrometers and 2500 micrometers.

An alignment hole 603 is precisely located and sized to provide precision alignment between adjacent beam-forming electrodes 502, 504, 506. Anchor tab 602 is used to retain the beam-forming electrode 600 in the glass rods that are used to maintain spacing and rigidity to all of the parts of the electron gun. An electrical connection tab 605 provides a location to weld, adhere, bond, or otherwise affix an electrical connection to the beam-forming electrode 600 so that a constant voltage may be applied to the beam-forming electrode 600. The alignment holes 603 in a preferred embodiment may have a diameter of 1500 micrometers, but may have any diameter or position consistent with the alignment pins used to align the remainder of the electron gun.

In a preferred embodiment shown in FIG. 6, the beam-forming electrode 600 may be fabricated from stainless steel, although any suitable metal or alloy may be used, such as copper, aluminum, silver, nickel, INCONEL, INVAR, or KOVAR. Those skilled in the art of electron gun and vacuum tube manufacturing techniques will be able to ascertain the suitability of a particular metal or alloy, depending upon the tube processing steps, temperatures, and vacuum pressures used during manufacture.

Various means of manufacturing the beam-forming electrode 600 can be used, such as punching with a punch and die combination, electron-discharge machining, laser cutting, electro-chemical milling, or traditional milling. The preferred method of manufacture corresponding to the beam-forming electrode 600 of FIG. 6 is to punch the outer profile of the beam-forming electrode 600, and then laser drill the apertures 604 and the alignment holes 603. An alternate means of manufacture of the electrode includes using photo masks and resists to accurately define the positions and sizes of the apertures 604 and the alignment holes 603, and then using a chemical or plasma means to remove material from the aperture 604 locations. Yet another means of manufacture is to use a high-pressure water jet to cut the material from undesired locations. Yet another means of manufacture is to use a wire saw to form the outside profile of the electrode, and then use any other of the above means of manufacture to define the apertures 604 and the alignment holes 603.

Figure 7:
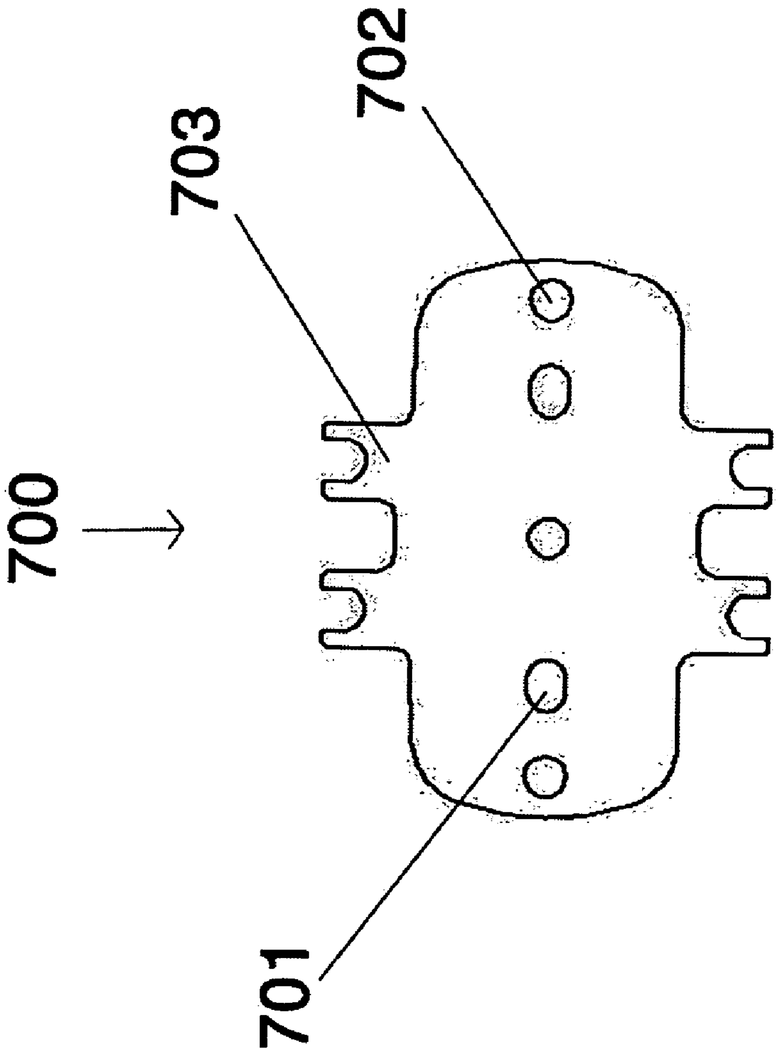
FIG. 7 is a detailed view of the insulating spacer of the beam-forming region for a three-beam electron gun used in a color CRT, showing placement of clear apertures to be aligned concentric with the aperture clusters of the metal electrodes.

FIG. 7 shows the detail of a preferred embodiment of an insulator 700 used in the beam-forming assembly 500 of the present invention that may be employed in a three-beam electron gun for a high-definition CRT application. Three insulator apertures 701 are positioned to be approximately concentric with the aperture clusters 601 in adjacent beam-forming electrodes 502, 504, 506. The insulator apertures 701 are required to have a diameter that is small enough to provide mechanical support and spacing to the adjacent beam-forming electrodes 502, 504, 506, but have a diameter that is large enough to prevent the accumulation of free charge due to passage of an electron beam in proximity to the insulator 700. The design of the insulator 700 provides for alignment holes 702 and anchor tabs 703 to establish initial alignment of the insulator 700 and to retain alignment of the insulator 700, respectively. A preferred embodiment of the insulator 700 provides insulator apertures 701 of diameter 1000 micrometers for the 7 aperture embodiment of the beam-forming electrode 600 of FIG. 6, but it is understood that the diameter of the insulator aperture 701 can be as small as 50 micrometers larger than the aperture cluster 601 diameter in the beam-forming electrode, or as large as 1500 micrometers larger than the aperture cluster diameter.

In another preferred embodiment, the insulator aperture 701 is elongated in the direction joining the three electron beams, allowing a single design of the insulator 700 to be used on electron guns with different spacings between the different electron beams. This allows an efficiency of manufacturing and inventory that is advantageous compared to maintaining individual insulator parts for every different electron gun.

A preferred material of the insulator 700 is alumina, but it is clear that other ceramic-based insulator materials may be used, of which zirconia, silica, and beryllia are examples, crystalline compounds of which mica, sapphire, diamond, and quartz are examples, or doped or intrinsic semiconductor materials, of which GaN, InN, and Si are examples, or polymer materials, of which polyimide, polyethylene, or polyacrylic are examples. The insulator 700 may be manufactured by laser-cutting the desired material, wire sawing, water-jet cutting, or milling with a chemical or plasma means. Other materials that can be used to make the insulator 700 include glass frit, ceramic paste, or liquid polymer compounds. In these cases, the insulator 700 does not have a definite shape, but accomplishes the same function as an insulator made from a more rigid material. Yet another material that can be used to make the insulator 700 is green (unfired) ceramic. This material would be punched, sawn, milled, laser-cut, or water-jet-cut in a particular shape that is larger than the desired finished part, so that upon firing the material, the shrinkage that occurs causes the insulator 700 to have the desired size and shape.

The thickness of the insulator 700 in successful embodiments of the invention can span from 25 micrometers to 250 micrometers, but the preferred embodiment may provide an insulator thickness of approximately 60 micrometers. A preferred embodiment of the insulator 700 also provides for the outer profile of the insulator 700 to be slightly larger than the adjacent beam-forming electrodes 502, 504, 506, to provide the feature of preventing an electrical short-circuit between any two of the beam-forming electrodes in the beam-forming assembly 500.

Figure 8:
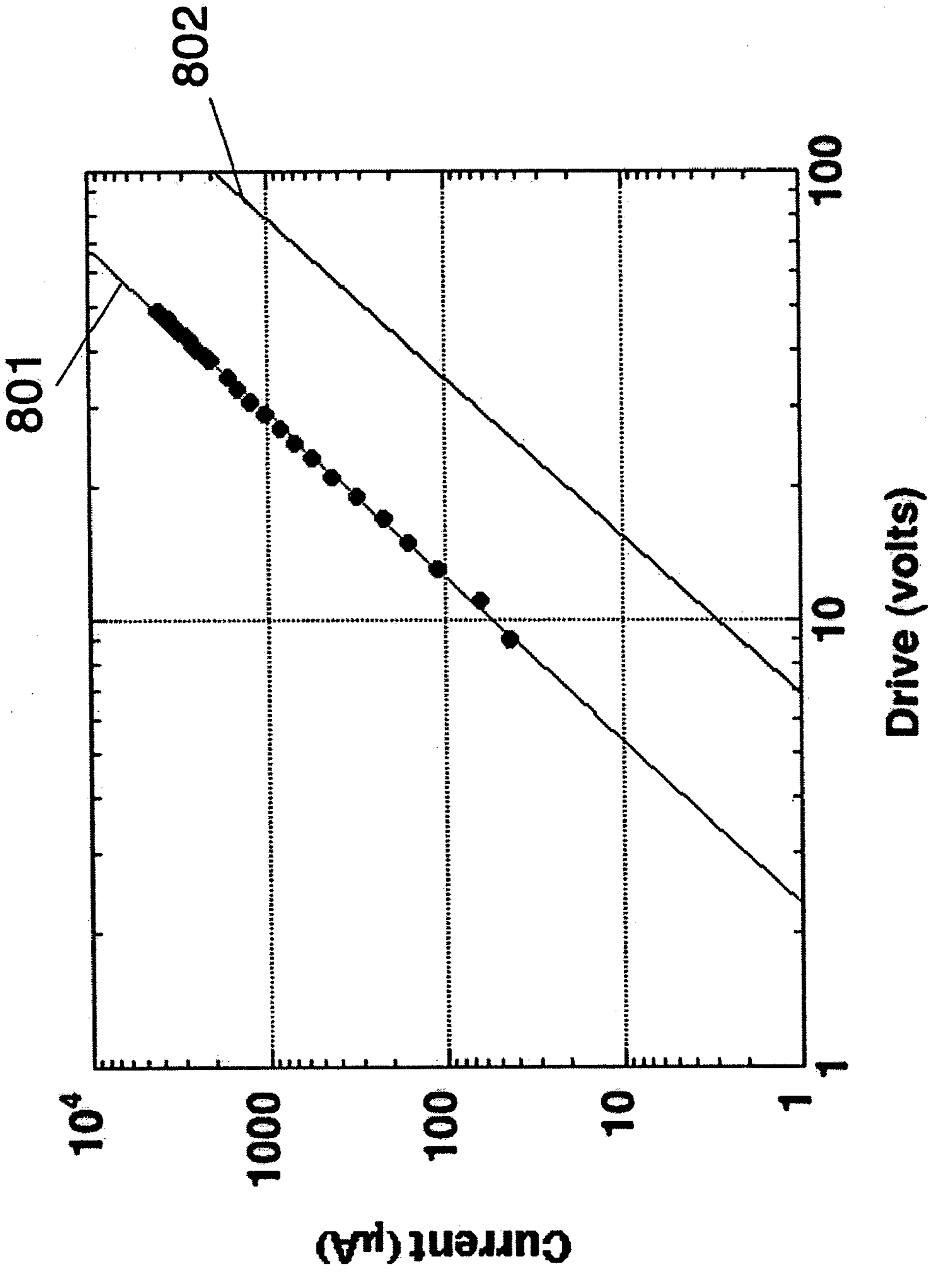
FIG. 8 is a graph of a measured drive curve in a mono-beam electron gun of the present invention using a seven-aperture aperture cluster.

FIG. 8 is a graph of measured electron beam current produced by an electron gun containing the beam-forming assembly of the present invention 801, as compared to the current produced by a typical electron gun that produces the same size spot in the same application 802. The graph plots the currents in a single electron beam collected by an anode electrode in a CRT, as a function of the drive. The drive is defined as the difference between the voltage applied to the cathode when the beam current is less than a small amount defined as "cutoff", typically 0.1 microampere, and the voltage applied to the cathode to achieve any other larger current. For example, reducing the voltage applied to the cathode by 10 volts below the cutoff voltage (a 10 volt drive) results in approximately 80 microamperes of electron beam current, according to the drive curve 801 of the present invention. It is to be observed that at all points on the drive curve, the present invention produces a substantially larger electron beam current than produced by a typical electron gun, corresponding to one of the desirable features of the invention.

Figure 9:
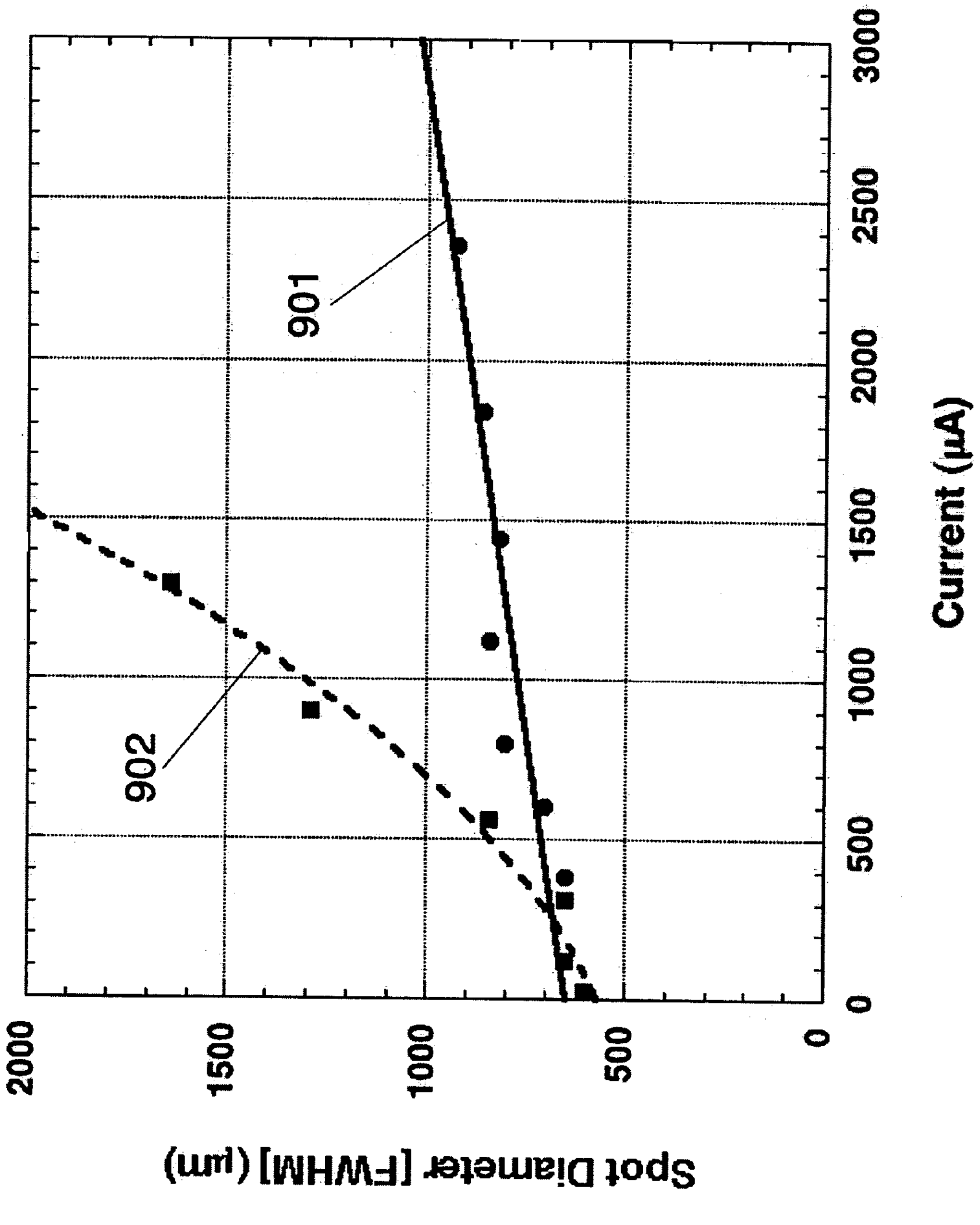
FIG. 9 is a graph of measured spot diameter in a mono-beam cathode ray tube used in a 27-inch color television application, containing the beam-forming region of the present invention.

FIG. 9 displays a graph 901 of spot diameter (FWHM) measured in a 27-inch diagonal television tube containing an electron gun produced with the beam-forming assembly of the present invention, and a graph 902 of spot diameter (FWHM) measured in a 27-inch diagonal color television tube with a prior art electron gun, both measured as a function of the instantaneous electron beam current. The spot sizes were measured by observing the screen of the television with a magnifying optical system and camera, and then using a computer to calculate the diameters of the spot corresponding to 50% of the peak spot brightnesses (FWHM). During the measurements, the electron beam was undeflected, and the electron gun was pulsed with a low duty cycle to prevent damage to the screen. According to the measurements and the principles of the invention, the spot size produced by the present invention is smaller than that produced by a typical electron gun operating in the same manner, and at any value of electron beam current. Furthermore, the graph illustrates a feature of the invention wherein the spot size does not rapidly change with increasing electron beam current, allowing no appreciable loss of display resolution as brightness is increased.

Figure 10:
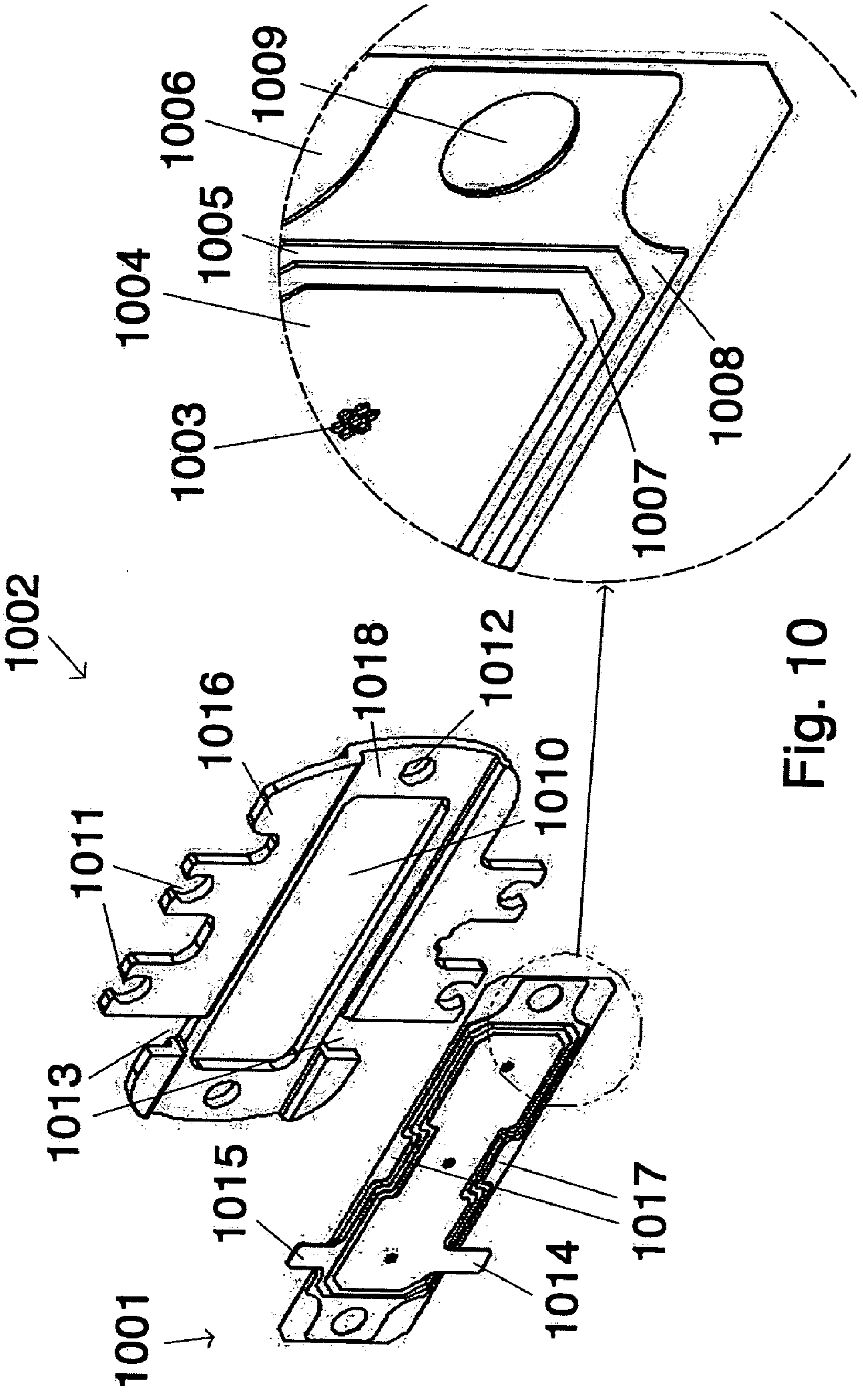
FIG. 10 is a detailed view of an alternate embodiment of the present invention, wherein the metal electrodes and insulating spacers that comprise the beam-forming region are laminated together into a single monolithic structure and it is attached to a support bracket.

FIG. 10 shows an alternate embodiment of the beam-forming assembly corresponding to a structure where the beam-forming electrodes and insulators are bonded together into a single monolithic structure 1001, which is subsequently attached to a single support bracket 1002. A feature of this embodiment may include the enclosure of the monolithic structure 1001 within a recessed region 1018 of the support bracket 1002 in order to protect the electrical integrity and alignment integrity of the monolithic structure 1001 during the beading process step of electron gun manufacture. Another feature is the elimination of one of the support brackets 501, 507, corresponding to the embodiment of FIG. 5, with a resulting decrease in cost. Another feature is the reduction in the total number of parts comprising the beam-forming assembly, which reduces the complexity and cost of electron gun manufacturing. The detail shown in the inset illustrates the stacked arrangement of a first beam-forming electrode 1004, an inter-electrode insulator 1007, a second beam-forming electrode 1005, a second inter-electrode insulator 1008, and a third beam-forming electrode 1006. Since the entire monolithic structure 1001 is laminated together, alignment is maintained between the apertures in the aperture clusters 1003 of the electrodes. In addition, alignment holes 1009 serve to align the entire monolithic structure 1001 with the remaining portions of the electron gun. Support bracket 1002 has alignment holes 1012 to ensure initial alignment with the other electron gun parts, and anchor tabs 1011 to maintain the initial alignment by embedding in the glass rods. The support bracket 1002 has its center portion removed to form a large aperture 1010 to allow passage of the electron beam. Support bracket notches 1013 are designed to allow first beam-forming electrode tab 1014 and second beam-forming electrode tab 1015 to protrude from the support bracket 1002 and provide a location for affixing wires whose purpose is to maintain the beam forming electrodes 1004, 1005 at a desired electrical potential. A tab 1016 on the support bracket 1002 provides a location for affixing a wire for the purpose of maintaining the third beam-forming electrode 1006 at a constant potential. The electrical connection between the support bracket 1002 and the third beam-forming electrode 1006 is made at pad locations 1017 on the monolithic structure 1001. Use of a weld, electrically-conductive adhesive, a bracket or other means serves to complete the electrical connection and to hold the monolithic structure 1001 in a fixed position relative to the support bracket 1002, and thus in a fixed position relative to the remainder of the electron gun.

In yet another embodiment a monolithic structure 1001 containing the beam-forming electrodes 1004, 1005, 1006, and the insulators 1007, 1008 is formed by adhering stainless steel, copper, nickel, Invar, or other metal or metallic alloy to both sides of a polymer substance, which when thermally pressed together, bonds the entire beam-forming electrode assembly into a laminated structure.

In yet another embodiment, the beam-forming electrodes 1004, 1005, 1006, are constructed from a semiconductor material that may have a dopant to increase the electrical conductivity. In this embodiment, the insulators 1007, 1008 may be formed by oxidizing the semiconductor surface or by depositing a semiconductor-oxide or metal-oxide compound to the preferred thickness using known techniques. For example, beam-forming electrodes 1004, 1005 and 1006 may be made of silicon that is doped with boron such that the bulk resistivity of the material is less than 1 ohm-cm. The insulators 1007 and 1008 may be formed by treating the electrodes to steam or oxygen at an elevated temperature to form a native silicon oxide film having suitable thickness. Alternatively, a film of silicon dioxide may be deposited onto the electrodes by sputtering or chemical vapor deposition (CVD) techniques, as is common in semiconductor manufacturing.

Figure 11:
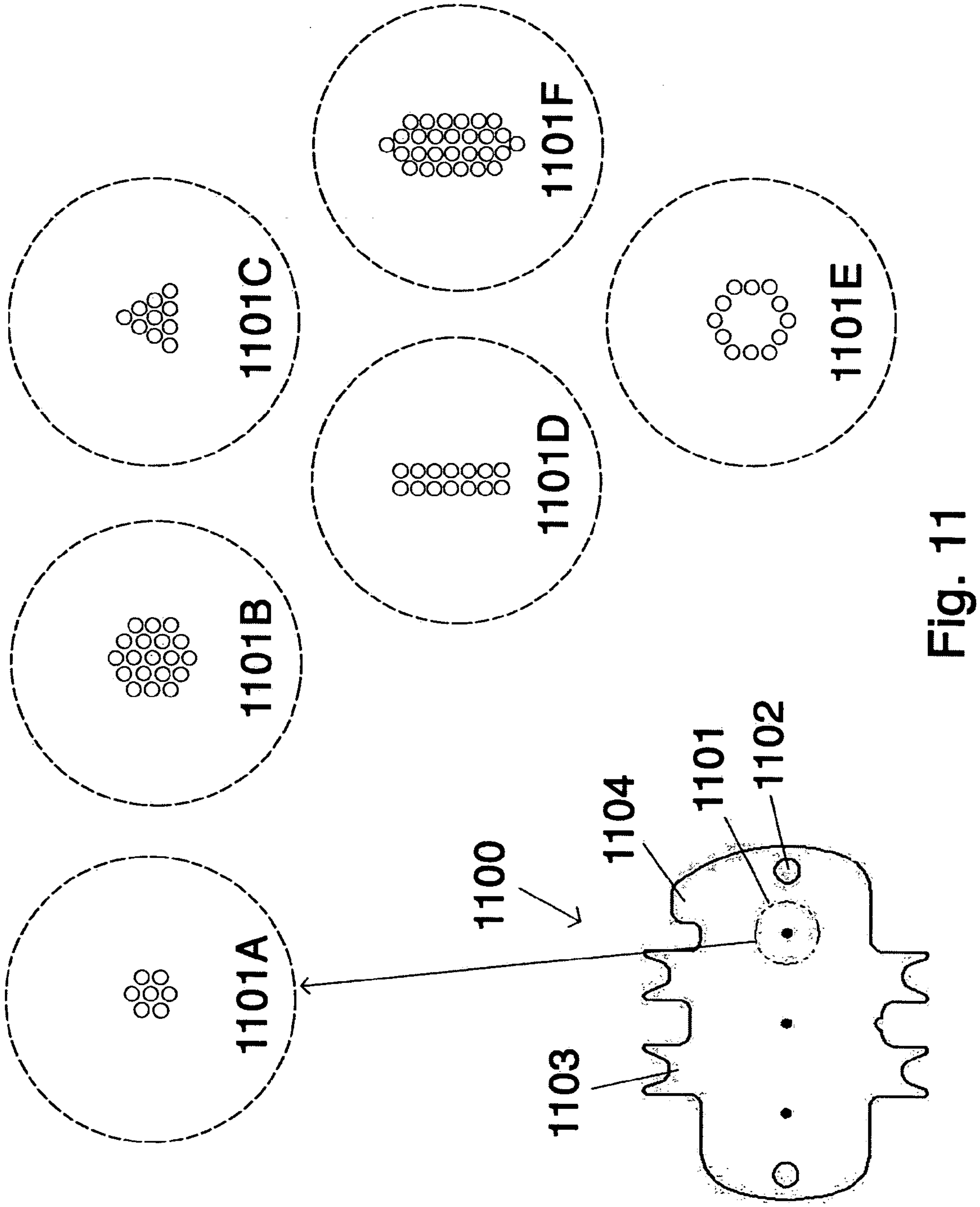
FIG. 11 is a detailed view of an electrode of the beam-forming region for a three-beam electron gun showing aperture clusters having different configurations.

Referring to FIG. 11, beam-forming electrode 1100 is shown. Aperture cluster 1101, alignment hole 1102, and tabs 1103 and 1104 are shown. Inset 1101A illustrates a preferred aperture configuration with seven apertures in a close-packed hexagonal pattern that can be encompassed by a circular or approximately circular shape. For example, the diameter of the encompassing circle may be about 500 micrometers and the diameter of each aperture about 150 micrometers. In FIG. 11, Inset 1101B, 19 apertures in a hexagonal pattern are shown. An encompassing circle is this example would generally have a larger diameter than in Inset 1101A. In general, the diameter of an encompassing circular shape may be in the range from about 30 to about 2500 micrometers when a hexagon pattern is present. FIG. 11, Inset 1101C shows apertures having a triangular encompassing shape. Inset 1101D illustrates apertures having a rectangular encompassing shape. Inset. 1101F illustrates apertures having approximately an elliptical encompassing shape. Inset 1101E illustrates apertures within an encompassing shape and having an area within the encompassing shape with spacing between apertures increased. This greater spacing between apertures in the interior of the encompassing shape may lead to an electron beam that is substantially hollow. This configuration provides less space charge-induced spreading of an electron beam formed by the apertures. Such a hollow or decreased charge density electron beam may be provided by increasing spacing between apertures in the interior of any encompassing shape.

The beam-forming electrodes such as 502, 504, 506 disclosed herein can be adapted to fit any electron gun, effectively replacing two or three electrodes in a prior-art electron gun. The electron gun so modified may be used as a drop-in replacement in any compatible CRT, transforming it into a high-definition, low-drive voltage display tube. The only significant modification to the operation of the electron gun, and hence the CRT it is enclosed within, is that the focus voltage of the main lens must be changed from the unmodified gun's focus voltage in order to make the main lens focus the collimated beams of electrons onto the screen—acting like a telescope that images an object at infinity onto a screen.

Prior art electron guns have a single emission area on the cathode that increases in size as beam current is increased, thus increasing the beam emittance in correspondence to the current. In CRTs and electron guns of the present invention, the spot size is smaller than prior art electron guns because the beam emittance stays constant as beam current is increased. Therefore, the gun of the present invention provides two advantages: (1) a smaller spot size (by approximately a factor of two at high electron beam current), and (2) a drive curve having lower cutoff voltage (by approximately a factor of three), which provides lower power consumption for driving the gun.

One of the advantages of the lower cutoff voltage is the possibility to modulate at high frequencies at powers decreased by a factor of the improvement in cutoff voltage squared, or approximately 5 to 9 fold. This advantage can become particularly important in high definition TV, where video modulation frequencies in the range of 100 megahertz are required to achieve desired resolution. A typical drive range on a standard cathode ray tube is about 100 volts from black level to full white and modulating at high definition TV frequencies of about 100 megahertz requires high power and components that are costly.

While particular preferred embodiments of the present invention have been described, it is not intended that these details should be regarded as limitations upon the present invention, except as and to the extent they are included in the following claims.

What we claim is:

1. A cathode ray tube comprising:

a vacuum envelope;

an electron gun including a cathode, the electron gun having an axis and comprising first, second, and third beam-forming electrodes, the electrodes having a selected thickness and being disposed perpendicular to the axis and having selected spacings therebetween, each of the beam-forming electrodes having a plurality of aperture clusters therein, the aperture clusters having a plurality of apertures within an encompassing shape;

a main lens, the main lens having a range of adjustable focal lengths; and a display screen, the display screen being disposed at a distance from the main lens within the range of the adjustable focal lengths so as to focus electrons passing through the plurality of aperture clusters onto the display screen.

2. The cathode ray tube of claim 1 further comprising a layer of insulating material between the beam-forming electrodes.

3. The cathode ray tube of claim 2 wherein the insulating material is a crystalline material or a ceramic material.

4. The cathode ray tube of claim 3 wherein the ceramic material is a melted glass frit.

5. The cathode ray tube of claim 2 wherein the insulating material is a polymer.

6. The cathode ray tube of claim 2 wherein the beam-forming electrodes and the layer of insulating material further comprise a bond therebetween to form a laminated beam-forming electrode stack.

7. The cathode ray tube of claim 1 wherein the first, second, and third beam-forming electrodes are formed from a highly doped semiconductor.

8. The cathode ray tube of claim 7 further comprising a layer of insulating material between the beam-forming electrodes, the insulating material being an oxide of the highly doped semiconductor.

9. The cathode ray tube of claim 1 wherein the number of apertures in each of the plurality of aperture clusters is in the range from about 4 to about 55 apertures.

10. The cathode ray tube of claim 1 wherein the number of apertures in each of the plurality of aperture clusters is in the range from about 6 to about 12 apertures.

11. The cathode ray tube of claim 1 wherein the encompassing shape of the aperture clusters is circular or approximately circular and a diameter or major dimension of the encompassing shape is in the range from about 30 micrometers to about 2500 micrometers.

12. The cathode ray tube of claim 11 wherein the diameter of each of the apertures in the plurality of clusters is in the range from about 15 micrometers to about 500 micrometers.

13. The cathode ray tube of claim 1 wherein the first, second, and third beam-forming electrodes have a thickness in the range from about 1 micrometer to about 150 micrometers.

14. The cathode ray tube of claim 1 wherein the selected spacings are in the range from about 10 micrometers to about 150 micrometers.

15. The cathode ray tube of claim 1 wherein the encompassing shape of the aperture clusters is selected from shapes consisting of rectangular, elliptical, triangular, circular and polygonal.

16. The electron gun of claim 15 further comprising within the encompassing shape of the aperture clusters an area of the electrodes wherein an aperture spacing is increased to values greater than the aperture spacing at the encompassing shape, so as to decrease spreading of an electron beam.

17. An electron gun, the electron gun having an axis, comprising:

a cathode or cathode support, a support bracket and an alignment rod;

first, second, and third beam-forming electrodes, the electrodes having a selected thickness and being disposed perpendicular to the axis and having selected spacings therebetween, each of the beam-forming electrodes having a plurality of aperture clusters therein, the aperture clusters having a plurality of apertures within an encompassing shape; and a main lens, the main lens having a range of adjustable focal lengths.

18. The electron gun of claim 17 further comprising a layer of insulating material between the beam-forming electrodes.

19. The electron gun of claim 18 wherein the insulating material is a ceramic or crystalline material.

20. The electron gun of claim 19 wherein the ceramic material is a melted glass flit.

21. The electron gun of claim 18 wherein the insulating material is a polymer.

22. The electron gun of claim 18 wherein the beam-forming electrodes and the layer of insulating material further comprise a bond therebetween to form a laminated beam-forming electrode stack.

23. The electron gun of claim 17 wherein the first, second, and third beam-forming electrodes are formed from a highly doped semiconductor.

24. The electron gun of claim 23 further comprising a layer of insulating material between the beam-forming electrodes, the insulating material being formed by oxidation of the highly doped semiconductor.

25. The electron gun of claim 17 wherein the number of apertures in each of the plurality of aperture clusters is in the range from about 4 to about 55 apertures.

26. The electron gun of claim 17 wherein the number of apertures in each of the plurality of aperture clusters is in the range from about 6 to about 12 apertures.

27. The electron gun of claim 17 wherein the encompassing shape of the clusters is circular or approximately circular and the diameter or major dimension of each of the aperture clusters is in the range from about 40 micrometers to about 2500 micrometers.

28. The electron gun of claim 17 wherein the diameter of each of the apertures in the plurality of clusters is in the range from about 15 micrometers to about 250 micrometers.

29. The electron gun of claim 17 wherein the first, second, and third beam-forming electrodes have a thickness in the range from about 1 micrometer to about 150 micrometers.

30. The electron gun of claim 17 wherein the selected spacings are in the range from about 10 micrometers to about 150 micrometers.

31. The electron gun of claim 17 wherein the encompassing shape of the aperture clusters is selected from shapes consisting of rectangular, elliptical, triangular, circular and polygonal.

32. The electron gun of claim 31 further comprising within the encompassing shape of the aperture clusters an area of the electrodes wherein an aperture spacing is increased to values greater than the aperture spacing at the encompassing shape, so as to decrease spreading of an electron beam.

33. The electron gun of claim 17 wherein the support bracket includes a recessed region adapted to include a monolithic structure including the beam-forming electrodes.

34. A method for operating a cathode ray tube, comprising:

operating a cathode to supply a source of electrons;

applying selected values of electrical voltage to first, second and third beam-forming electrodes, the electrodes having a selected thickness and being disposed along and perpendicular to an axis and having selected spacings therebetween, each of the beam-forming electrodes having a plurality of aperture clusters therein, the aperture clusters having a plurality of apertures within an encompassing shape and being aligned in the direction of the axis, so as to form a plurality of collimated beams of electrons; and applying selected values of electrical voltage to a main lens, the main lens having a range of adjustable focal lengths, so as to adjust the focal length of the main lens and focus the plurality of collimated beams of electrons onto a display screen.

35. The method of claim 34, further comprising:

providing an insulating layer between the first, second and third beam forming electrodes.

36. The method of claim 34, wherein between each of the first, second and third beam forming electrodes is an insulating layer.

37. The method of claim 34, wherein each of the aperture clusters form between 6 and 12 collimated beams of electrons.

* * * * *